(12) United States Patent
Dujardin et al.

(10) Patent No.: US 8,372,417 B2
(45) Date of Patent: *Feb. 12, 2013

(54) POLYMER COMPOSITE FILM WITH BARRIER FUNCTIONALITY

(75) Inventors: Ralf Dujardin, Düsseldorf (DE); Arno Schmuck, Leichlingen (DE); Almuth Streitenberger, Köln (DE)

(73) Assignee: Bayer Innovation GmbH, Duesseldorf (DE)

( * ) Notice: Subject to any disclaimer, the term of this patent is extended or adjusted under 35 U.S.C. 154(b) by 966 days.

This patent is subject to a terminal disclaimer.

(21) Appl. No.: 12/175,276

(22) Filed: Jul. 17, 2008

(65) Prior Publication Data

US 2009/0130158 A1    May 21, 2009

Related U.S. Application Data

(60) Provisional application No. 60/956,755, filed on Aug. 20, 2007, provisional application No. 60/951,016, filed on Jul. 20, 2007.

(51) Int. Cl.
*A01N 25/10* (2006.01)
*A01N 25/34* (2006.01)

(52) U.S. Cl. ........ 424/411; 424/403; 424/405; 424/409; 523/122; 523/132

(58) Field of Classification Search .................. None
See application file for complete search history.

(56) References Cited

U.S. PATENT DOCUMENTS

| | | | |
|---|---|---|---|
| 3,551,346 A * | 12/1970 | Breen et al. | 264/4.3 |
| 4,007,258 A * | 2/1977 | Cohen et al. | 424/409 |
| 4,199,548 A | 4/1980 | Kaiho et al. | |
| 4,538,531 A | 9/1985 | Wong | |
| 4,819,374 A | 4/1989 | Gemgnani | |
| 4,942,068 A * | 7/1990 | Schweicher et al. | 427/420 |
| 5,906,865 A | 5/1999 | Ellermeier et al. | |
| 6,046,243 A | 4/2000 | Wellinghoff et al. | |
| 6,737,491 B2 | 5/2004 | Soerens et al. | |
| 6,808,801 B2 | 10/2004 | George et al. | |
| 6,849,685 B2 | 2/2005 | Soerens et al. | |
| 6,887,961 B2 | 5/2005 | Soerens et al. | |
| 6,964,803 B2 | 11/2005 | Krautkramer et al. | |
| 7,115,321 B2 * | 10/2006 | Soerens et al. | 428/500 |
| 7,205,259 B2 | 4/2007 | Soerens | |
| 2005/0227026 A1 | 10/2005 | Finestone | |
| 2009/0247551 A1 | 10/2009 | Jeschke et al. | |
| 2009/0253749 A1 | 10/2009 | Jeschke et al. | |
| 2010/0240705 A1 | 9/2010 | Jeschke et al. | |

FOREIGN PATENT DOCUMENTS

| | | |
|---|---|---|
| DE | 2819515 A1 | 12/1978 |
| DE | 195 00 402 A1 | 11/1996 |
| DE | 69629891 T2 | 7/2004 |

(Continued)

OTHER PUBLICATIONS

International Search Report for PCT/EP08/05545, dated Feb. 12, 2008.

(Continued)

*Primary Examiner* — Neil Levy
(74) *Attorney, Agent, or Firm* — Baker Donelson Bearman Caldwell & Berkowitz, PC

(57) ABSTRACT

Polymer composite material with barrier functionality, in particular for the use in fumigation methods, comprising at least one base polymer compound and at least one barrier functional layer, wherein the barrier functional layer comprises at least one binder that is cross-linkable and after cross-linking capable of water absorbing and gel-forming.

15 Claims, 2 Drawing Sheets

FOREIGN PATENT DOCUMENTS

| | | |
|---|---|---|
| EP | 0 214 507 A2 | 3/1987 |
| EP | 0249694 A2 | 12/1987 |
| EP | 539588 A1 | 5/1993 |
| EP | 0 938 935 A2 | 2/1999 |
| EP | 1 023 949 A1 | 1/2000 |
| JP | 63-175072 A | 7/1988 |
| WO | 99/32286 A1 | 7/1999 |
| WO | 99/47595 A1 | 9/1999 |
| WO | 03/088747 A1 | 10/2003 |
| WO | 2007095229 A2 | 8/2007 |
| WO | 2007115643 A1 | 10/2007 |
| WO | 2007115644 A1 | 10/2007 |
| WO | 2007115646 A1 | 10/2007 |
| WO | 2007149134 A1 | 12/2007 |

OTHER PUBLICATIONS

"Directive 98/8/EC of the European Parliament and of the Council of Feb. 16, 1998 Concerning the Placing of Biocidal Products on the Market," Official Journal of the European Communities, Apr. 24, 1998, pp. 1-63.

* cited by examiner

Figure 2

| Agro-Foil LDPE (4 mil) | uncoated | coated | | | uncoated | | coated | | |
|---|---|---|---|---|---|---|---|---|---|
| permeating gas / foil conditioning / remarks | N2 moistened | N2 short pre-dried | N2 moistened | N2 moistened | N2+MeBr dry | N2+MeBr moistened | N2+MeBr short pre-dried | N2+MeBr pre-dried | N2+MeBr moistened |
| foil thickness (μm) | 100 | 135 | 135 | 135 | 100 | 100 | 135 | 135 | 135 |
| temp. Cell (°C) | 25.3 | 28.8 | 25.4 | 25.4 | 25.4 | 25.4 | 25.5 | 25.5 | 25.5 |
| transmission rate (with delta P of 1 bar) | | | | | | | | | |
| cm/h | 2.2E-03 | 4.0E-05 | 3.8E-04 | 1.7E-04 | 6.0E-03 | 5.6E-03 | 5.0E-05 | 1.2E-04 | 5.3E-05 |
| $T_M$ g/(m²*d) | 0.67 | 0.01 | 0.11 | 0.05 | 2.03 | 1.87 | 0.02 | 0.04 | 0.02 |

POLYMER COMPOSITE FILM WITH BARRIER FUNCTIONALITY

CROSS REFERENCE TO RELATED APPLICATIONS

This application claims the benefit of U.S. Provisional Appl. No. 60/956,755, filed Aug. 20, 2007, and U.S. Provisional Appl. No. 60/951,016, filed Jul. 20, 2007, the content of which are incorporated herein by reference in their entirety.

BACKGROUND OF THE INVENTION

1. Field of the Invention

The present invention relates to polymer composite films with barrier functionality, methods of producing such polymer composite films and their use, in particular for agricultural fumigation.

2. Description of Related Art

A wide variety of polymer films like biodegradable mulch films for reducing weed growth or special biodegradable horticulture pots are known which are used in the field of agriculture. An emphasis in the equipment of these polymer films lies in the task either to stabilize the material against environmental and chemical influences or to improve the biodegradability of the material.

Examples for agricultural films stabilized against pesticides with an additive can be found in Japanese application JP 631 75 072. In the European patent application EP 0214507 there are UV stabilizers described which are used in films for outdoor agriculture.

Apart from that, olefin polymer films containing various types of additives are generally known in the art. In U.S. Pat. No. 4,538,531, for example, an improved olefin based polymer film for the use in fumigation methods is described comprising a permeability reducing amount of one or more fatty acid derivatives such as stearicamide.

However, the balance between resin cost, polymer processability, film strength, film life span, and film barrier ability is still a challenge.

This problem is particularly acute in the area of films used for confinement of chemical treatment agents, and especially soil treatment tarpaulins or soil covering materials. For these and similar uses large amount of film are used to confine chemical treatment agents to the area where they are applied and are desired and expected to treat. The chemical treatment agents used, often volatile gases, tend to diffuse, wash, dissolve or blow away unless prevented from doing so. The rapid loss or escape of these treating chemicals can be undesirable for several reasons. For example, the chemicals may be hazardous or toxic, the desired treatment effects may not be achieved and/or lager amounts of chemicals may be required to achieve the desired effects.

The problem of providing a film fit for the use as confinement in the described methods is further complicated by the fact that during usage such films are subjected to conditions that punctures and tears tend to occur.

All yet known polymer films in agriculture or horticulture share the problem that the lifespan of the confinement material is often shortened due to the necessity of various additives. The additives can render the polymer films more brittle which reduces the permeability for gaseous compounds on the one hand and the resistance to punctures on the other hand. Furthermore, most known fumigation films are composed of barrier polymers like poly ethylene vinyl alcohol or polyamide sandwiched between olefin polymer layers to keep them from swelling. Alternatively, metallised multi-layered films are used. Such multi-layered structures show significant stiffness together with a high tendency to roll up. Both features make the application in the field complicated and labour intensive.

BRIEF DESCRIPTION OF THE DRAWINGS

FIG. 2 is a chart showing transmission rate.

SUMMARY OF THE INVENTION

Figure 1:
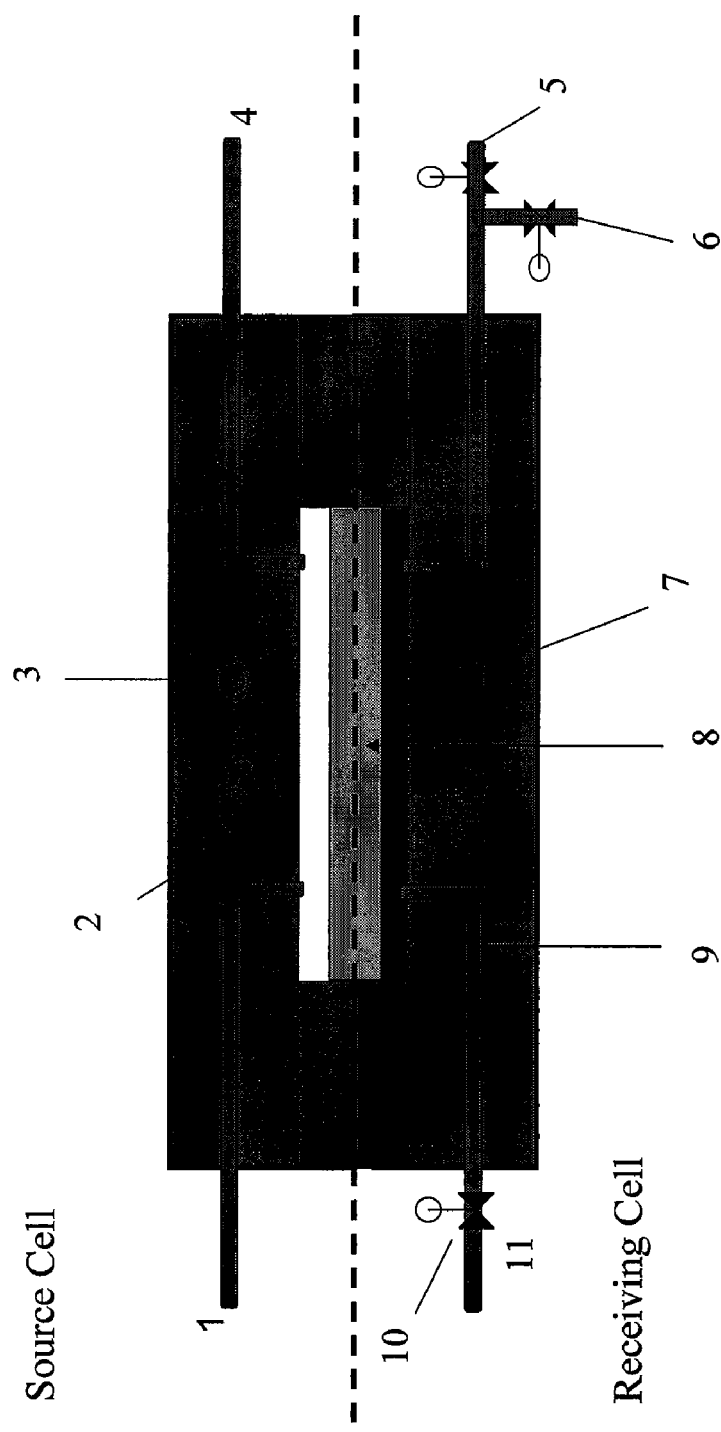
FIG. 1 is a schematic of a gas permeator analytic cell as used in connector with the present invention.

Therefore, it is the object of the present invention to provide a polymer composite film preferably for the use in agricultural fumigation methods which has an improved barrier functionality, a good processability, and a long lifespan together with a reduced stiffness and a reduced tendency to roll up.

It is another object of the present invention to provide a method for the production of such a polymer composite film.

This object is solved by a polymer composite film with barrier functionality, in particular for the use in agriculture, comprising at least one base polymer compound and at least one barrier functional layer, wherein the barrier functional layer comprises at least one binder that is cross-linkable and after cross-linking capable of water absorbing and gel-forming. In a preferred embodiment of the invention, the binder is capable of absorbing at least about 15, more preferably 25 times its weight in an aqueous solution containing 0.9 weight percent sodium chloride; preferably the binder is a superabsorbent polymer, more preferably the binder is a polyacrylate.

DETAILED DESCRIPTION OF A PREFERRED EMBODIMENT

Under the term base polymer compound all polymer compounds are understood which show a sufficient UV and weather stability to withstand constant outdoor exposure at least for 12 months and do not react with organic biocides used in agriculture and whose properties are not changed by the organic biocide. As the flexibility of polymer material is dependent upon the material thickness; especially flexible films of 10 μm to 250 μm thickness are understood under the term base polymer material.

Under the term barrier functional layer there are all polymer based coating layers understood which are capable of building a water barrier especially to the permeation of fumigation gases which are emitted by diffusion from fumigated soil. In another preferred embodiment of the invention the barrier functional layer comprises water and a superabsorbent polymer which is capable of a water take-up of at least 100 weight % per gram polymer.

Fumigation is a method of pest control that completely fills an area with gaseous pesticides to suffocate or poison the pests within. It is utilized for control of pests in buildings, soil, grain, and produce, and is also used during processing of goods to be imported or exported to prevent transfer of exotic organisms. Over the area to be treated a rubber or polymer film is placed. This concentrates the gases as well as keeps them from escaping and doing harm to people and wildlife in the neighbourhood.

Methyl bromide was among the most widely used fumigants until its production and use was restricted by the Montreal Protocol due to its role in ozone depletion. Other widely used fumigants include phosphine, 1,3-dichloropropene, chloropicrin, methyl isocyanate, methyl iodide, hydrogen cyanide, sulfuryl fluoride, hydrogen disulphide and formaldehyde.

Fumigation usually involves the following phases. First the area to be fumigated is usually covered to create a sealed environment; next the fumigant is released into the space to be fumigated; then, the space is held for a set period while the fumigant gas percolates through the space and acts on and kills any infestation in the area, next the space is ventilated so that the poisonous gases are allowed to escape from the space, and render it safe to enter.

Advantageously, the polymer composite material with the barrier functional layer of the present invention is capable of securing the confinement of fumigation chemicals over a long period of time while still remaining good processability and a long life span. By employing a barrier functional layer comprising at least one binder that is cross-linkable and after cross-linking capable of water absorbing and gel-forming, the permeability of the fumigation chemicals is strongly reduced. The inventive combination with at least one binder that is cross-linkable and after cross-linking capable of water absorbing and gel-forming for the barrier layer secures that water is (during use) absorbed but also prevents that the absorbed water is evaporated even in the harshest conditions. Apart from that, due to the barrier coating layer a much easier handling of the inventive film is achieved by reducing the stiffness and the tendency to roll up.

The base polymer compound according to the present invention can be selected from the group consisting of polyethylene terephthalate, polyvinyl chloride, polyolefins such as polyethylene (such as for example LDPE, HDPE) and polypropylene, polystyrene, polyester, polyether, polyacrylate, polycarbonate, polyamide and polyurethane which can optionally comprise commonly used pigments, UV stabilizers, UV absorbers, IR absorber and light diffuser. These materials show the required resistance to outdoor exposure and can be used in form of flexible films as wells as molded inflexible articles like trays and pots.

The barrier coating layer of the present invention is preferably formulated from three components: binders, additives and the carrier fluid. Generally, the barrier coating layer should show the same resistance to outdoor exposure like the base polymer compound.

Binders primarily function as an adhesive to the base polymer. Binders are polymer adhesive systems with varying molecular weights. The molecules in the binder can be cross-linked during the curing stage to improve strength and create the polymer composite material.

In the preferred embodiment of the present invention the barrier coating layer can be based on water soluble polymer adhesive systems comprising binders which are cross-linkable and which are after cross-linking water insoluble but water-swellable and capable of gel-forming by water absorbing. The term "cross-linkable" according to the present invention indicates that the binders form a network preferably initiated by heat, pressure, radiation and/or chemicals (hereinafter also referred to as hardener). The term "gel-forming" according to the present invention refers to a colloid structure comprising at least 50%, at least 75% and typically at least 95% wt liquid, which is immobilized by surface tension between it and a macromolecular network of fibres built from a small amount of binders. In a preferred embodiment the liquid of the gel is water and the gel is a hydrogel in which water is the dispersion medium.

The binders are preferably selected from the group comprising gelatin; alginates; cellulose based polymers such as methyl cellulose, hydroxymethyl cellulose, carboxymethylcellulose, cellulose acetate phthalate, and the like; starch based polymers such as carboxymethyl starch; natural gums, such as gum arabic, locust bean gum, carrageenan gum and xanthan gum; pectins; polymers formed from acid-group containing monomers, such as poly(acrylates) (including poly(acrylic acid), poly(methacrylic acid), and the like), poly (ethers), poly(acrylamides), poly(vinyl alcohol), maleic anhydride copolymers, poly(vinyl sulfonates), hydrolyzed acrylonitrile grafted starch, acrylic acid grafted starch, poly (N-vinyl pyrrolidone), poly (2-hydroxyethylacrylate), poly (2-hydroxyethyl-methacrylate), poly (sodium acrylate-co-acrylic acid), poly(vinylsulfonic acid), poly (ethyleneoxide), block co-polymers of ethylene oxide with polyamides, polyesters, and polyurethanes, and salt forms mixtures and copolymers of the above.

Particularly preferred binders comprise water soluble (but after crosslinking insoluble) chemical and/or physical cross-linkable adhesive polymers such as polyvinyl alcohol, polyvinyl methyl ether; polyvinyl pyrrolidone; polyethylene oxide; cellulose derivatives such as dextrans and starches; polyacrylates such as polyacrylacid, polyacrylamides, methyl cellulose, carboxy methyl cellulose, starch-based polymers, gelatin, casein, xanthan hydroxyl-ethyl-cellulose hydroxyl propyl cellulose and/or dispersions from block co-polymers of ethylene oxide with polyurethane.

Illustrative examples of particularly useful gel-forming, water absorbing cross-linkable coating binders that are capable, under the most favorable conditions, of absorbing at least about 5, more preferably at least 10, even more preferably at least 15 and most preferably at least 25 times its weight in an aqueous solution containing 0.9 weight percent sodium chloride are preferably selected from the group comprising superabsorbers such as poly(acrylates) including poly (acrylic acid), poly(methacrylic acid), and the like), maleic anhydride copolymers, poly(vinyl sulfonates), poly (sodium acrylate-co-acrylic acid), poly(vinylsulfonic acid), (as for example described in the U.S. Pat. Nos. 6,737,491, 6,849, 685, 6,887,961, 7,115,321, 6,964,803, 6,808,801, 7,205,259), gelatin and/or dispersions from block co-polymers of ethylene oxide with polyurethane.

A particularly useful coating material according to the present invention comprises the combination of at least two water absorbent cross-linkable polymer binders, wherein one water absorbent cross-linkable polymer binder is gelatin. In a particularly preferred embodiment coating layers comprise the combination of a gelatin binder and a superabsorber binder such as a polyacrylate binder.

Gelatin has been shown to be surprisingly beneficial as it supports the attachment of the water absorbent cross-linkable polymers to the base polymer without substantially interfering with the properties of the water absorbent cross-linkable polymers.

Any gelatin such as photographic gelatin, feed gelatin, edible gelatin, industrial gelatin, protein gelatin and so on can be used for such a preferred coating layer. By adding as an additive a hardener, the gelatin is cross-linked due to a reaction of free amino-, imino- and hydroxyl groups.

Additives are defined as insoluble pigments or low molecular weight chemicals in coating formulations that allow coatings to perform specific functions but do not contribute to the biocide function. Additives include but are not limited to pigments. Pigments are typically the colorant portion of a coating material, but can also perform corrosion protection or stability in ultraviolet (UV) light. Additives also include but are not limited to non-pigments. Non-pigment additives include stabilizers to block attacks of ultraviolet light or heat, hardener to speed up the cross-linking reaction, co-solvents to increase viscosity, or plasticizers to improve uniform coating.

In a further preferred embodiment of the invention, a hardener, preferably formaldehyde is used as an additive to crosslink the coating layer material and to improve the attachment of the layer material to the base polymer.

A particularly useful composite material relates to a base polymer wherein the coating materials comprise a combination of water absorbent cross-linkable polymers, preferably superabsorbers, more preferably polyacrylates, gelatin and a hardener, preferably formaldehyde.

The carrier fluid is typically a liquid such as an organic solvent or water. The carrier fluid allows the coating materials to flow and be applied by methods such as spraying, dipping, cascade and/or curtain casting. This component may be in the coating formulation before application, but evaporates afterwards to allow the solid materials to immobilize and form the polymer composite material. The polymer composite material can optionally be dried.

The carrier fluid might therefore be completely absent, partially present or present in the final, ready-to-use polymer composite material. In a preferred embodiment the carrier fluid is absent or only partially present in the final, ready-to-use polymer composite material. However, the skilled person in the art acknowledges that water or another liquid will be absorbed by the polymer composite material during use and will play an important role for the functionality of the polymer composite material.

In a further preferred embodiment of the invention water or aqueous solutions with ethanol, aceton, 1,4-dioxane, tetrahydrofuran, dichlormethane, acetonitrile, dimethylformamide, dimethylsulfoxide, acetic acid, n-butanol, isopropanol, n-propanol, methanol, formic acid and/or other solvents known to the skilled person in the art are used as carrier fluids.

In a further preferred embodiment of the invention, the base polymer is Corona treated to enhance the attachment of the coating layer(s) to the base polymer.

In another preferred embodiment of the invention, the base polymer (preferably in form of a film) is at least on one side Corona treated and comprises at least on one side at least one layer with a binder, preferably superabsorbers and more preferably polyacrylates. In a preferred embodiment, the base polymer further comprises at least on one side at least one coating layer with an additive, preferably a hardener. In another preferred embodiment at least one of these coating layers further comprises gelatin. In a more preferred embodiment of the invention all layers further comprise gelatin. In a more preferred embodiment of the invention, the base polymer further comprises at least one coating layer with at least one organic biocide.

In another preferred embodiment of the invention, the base polymer is preferably on both sides Corona treated and has on both sides at least two layers comprising at least one coating layer with binder(s), preferably superabsorbers and more preferably polyacrylates. In a preferred embodiment, the base polymer further comprises at least one coating layer with an additive, preferably a hardener (for closing-off). In another preferred embodiment at least one of these coating layers further comprises gelatin. In a more preferred embodiment of the invention all layers further comprise gelatin.

The polymer composite material according to another preferred embodiment of the present invention can be a multilayer coating structure and the barrier functional layer is incorporated into repeating coating layers. As an example, different binders can be incorporated in different layers or a layer can comprise different binders. A preferred embodiment of the invention comprises a polymer composite material wherein the polymer composite material is of a multilayer coating structure and wherein the same or different barrier functional layers are incorporated into repeating coating layers.

By the incorporation of the barrier functional layer into repeating coating layers a control of the confinement rates is even better achievable. Apart from that, different barrier functional layers can be incorporated so that even scratches and superficial damages of the film do not impart the safe containment of the potentially hazardous chemicals. It is known that all other fumigants besides methyl bromide and methyl iodide have a lack of effectiveness on pest management in soil fumigation. In another preferred embodiment of the present invention an organic biocide is added to the barrier functional layer.

Like that, the coating layer can not only confine the fumigation chemicals and thus reduce the amount needed for effective treatment but it can also prevent the soil from being infested again. Accordingly, even less chemical is needed to achieve the desired effect.

The organic biocide is preferably selected from the group consisting of pesticides, herbicides, insecticides, algicides, fungicides, moluscicides, miticides, and rodenticides. Moreover, the organic biocide can even more preferably be selected from the group consisting of germicides, antibiotics, antibacterials, antivirals, antifungals, antiseptics, antiprotozoals and/or antiparasites as well as mixtures thereof.

In another preferred embodiment of the invention the organic biocide is selected from the group of antiseptics and/or disinfectants for medical use and food as well as mixtures thereof.

As the regulations for chemical substances being considered safe for the use in the agricultural, food and medical field are constantly changing, such organic biocides are most preferred for the present invention which comply with the actual official regulations for chemical substances and especially for antiseptics and disinfectants in those fields.

Especially those substances which are listed in the European the Biocidal Products Directive (98/8/EC) by the European Commission are preferably used as organic biocides according to the present invention.

In another preferred embodiment of the present invention the organic biocide is selected from the group comprising acetamides and anilides herbicides like alachlor, acetochlor, metolachlor, naproamid, carbamate and thiocarbamate herbicides like asulam, terbucarb, thiobencarb, chlorphenoxy herbicides like 2,4,-D, 2,4-DP, 2,4-DB, 2,4,5-T, MCPA, MCPB, MCPP, dicamba, dipyridyl herbicides like paraquat, diquat, nitrophenolic and dinitrocresolic herbicides like alconifen, oyxfluorfen, rimsulfuron, trifloxysulforon, cyclohexyloxim herbicides like clethodim, sethoxydim, phosphonate herbicides like glyphosate, glyfusinate, fosamine ammonium, triazine, triazone, traizolon herbicides like simazine, cyanazine, metribuzin, carfentrazone, urea herbicide derivatives like diuron, flumeturon, linuron, haloulfuron, ethoxysulforon, antibiotics insecticides like abamecitin, spinosad, cyclodien insecticides like endosulfan, insect growth regulators like pyriproxfen, carbamate insecticides like methomyl, oxamyl, nicotenoide herbicides like imidacloprid, pyrethroid herbicides like cyfluthrin, esfenvalerate, lambda-cyhalothrin, oxadiazine insecticides like indoxacarb, organophosphorus insecticides like methamidophos, acephate, naled, malathion, acetamide and anilide fungicides like mefenoxam, boscalid; fenhexamid, aliphatic nitrogen fungicides like cymoxanil, aromatic fungicides like chlorothalonil, dichloran, carbamate and thiocarbamate fungicides like mancozeb, maneb, propamocarb, thiram, conacol, myclobutanil, imidazole, morpholin and oxazol insecticides, thiophanate, dimetomorph, famoxadone, organophosphorous fungicides like fosetyl, phatlimid fungicides like captan, strobillurin fungicides like azoxystrobin, pyraclostrobin, trifloxystrobin, azibenzolar, urea derivative fungicides like bentaluron, pencycuron, oquinazamid, quaternary ammonium antiseptic compounds like benzalkonium chloride, cetyl pyridinium chloride, quaternary ammonium related antiseptic compounds like chlorhexidine gluconate, polyhexamethylene biguanide hydrochloride and octenidine dihydrochloride.

Most preferably, the organic biocide of the present invention is a non-liquid non-oil substance at room temperature with low volatility whereby the substance is solid or formulated in solid form. The choice of such substances improves the release controllability and the storage stability of the polymer composite material. Especially, essential oils as organic biocides should be avoided because of the difficulty to provide an even dispersion in the polymer base compound. Furthermore, the mechanical stability of the polymer composite material could be deterred in the production process due to bubble wrap and the like if liquids or substances with high volatility would be incorporated.

In another embodiment of the present invention the polymer composite material can withstand at least 24 months of outside exposure to sunlight and weather. That is independent on whether there is a coating layer present or not. By having such a minimum resistance the polymer compound is sure to fulfil the requirements of the intended use in agriculture as fumigation or mulch film, for instance.

Likewise, the polymer composite material should not be biodegradable. The function of the polymer composite material should be usable over a long period of time so that for example no weeds, pests or fungi can harm the plants as they grow in a field under the protection of the polymer composite biocide material. Furthermore, the articles of the intended use like films should be useable over a wider period of time and should not degrade in one planting and harvesting season, for example. Especially the mechanical stability of the films should be kept high because the film should preferably be retractable from the field and reusable.

It is within the scope of the present invention that the inventive polymer composite material comprises additional pigments, additives and fillers which are widely known to the skilled person.

In another preferred embodiment of the present invention the barrier functional layer is capable of absorbing water to comprise a water barrier of at least 0.4 mm thickness. Thus, a minimal confinement can be provided even over a long period of time and in hot weather conditions.

Preferably the thickness of the whole coating layer with binder(s), preferably superabsorbers and preferably also with gelatin is between 1-100 $\mu$m, preferably 5-40 $\mu$m, and particularly preferred 10-30 $\mu$m. The whole coating layer can be produced by coating several layers of binder(s), preferably superabsorbers and preferably also gelatin for example with cascade or curtain casting. The thickness of the whole coating layer with the additive, preferably the hardener is 0.2-5 $\mu$m, preferably 0.5-3 $\mu$m, even more preferably 2-3 $\mu$m. The whole coating layer with the additive, preferably hardener and preferably also with gelatin can be produced by coating several layers of the hardener and preferably with gelatin for example with cascade or curtain casting.

The base polymer has a thickness of 10 to 250 $\mu$m, preferably of 20 to 120 $\mu$m, more preferably 20-50 $\mu$m.

Another subject of the present invention is a method for the production of a polymer composite material according to the present invention including the step of coating the base polymer compound with at least one barrier functional compound comprising a carrier fluid and a binder, preferably a superabsobent polymer, more preferably a polyacrylate polymer and curing the mixture to give a coating layer.

The "barrier functional compound" preferably further comprises gelatin. In a preferred embodiment of the invention, binders, preferably superabsorbers, more preferably polyacrylates, gelatin and as an additive a hardener are used as barrier functional compounds.

The coating compounds can be applied to the workpiece made of the base polymer in a variety of ways. Coatings compounds can be sprayed over the part, or the part can be dipped into a tank of coating material. Other methods include showering parts with coatings or rolling parts between large barrels to spread on the coating.

Cascade casting or curtain casting advantageously allows the application of multiple layers, also of different thicknesses, onto the polymer composite material in a one work step.

The application of the coating layer is preferably carried out by curtain coating. The method of curtain coating is well known in the field of photographic films and papers and can be advantageously applied to the coating of the present invention. Improved methods of curtain coating procedures that can be used to produce the polymer composite material of the present invention includes such procedures as they are described in EP 1 023 949 A1, EP 938 935 A2, U.S. Pat. No. 5,906,865, DE 195 00 402, and EP 275 015 B1, which are therefore incorporated by reference.

In the process of curtain coating, a base film or paper web is moved continuously by a transport device through a coating zone and is thereby coated with one or more layers either wholly or partially by the free-falling liquid curtain.

In the photographic industry, this process is used, for example, to apply photosensitive and photoinsensitive coatings. These coatings comprise mostly multiple layers formed from aqueous coating solutions which are coated as layer composites in the liquid state onto the base. The curtain in the curtain-coating process can be wider or narrower than the base. The base of the photographic application is mostly a synthetic film or a paper web. Coating speeds can vary in accordance with the base material and thickness and with the thickness of the liquid curtain and its viscosity, for example. In so called high coating speed applications the photographic coating solutions can be applied at a base speed from more than 250 meters per minute. The coated base then passes through a drying device in which the coating solution is dried. The dry film web is wound up. At this point, the edges of the web must be dry or else the individual layers of the roll will adhere.

With the advantageous possibility of producing the polymer composite material of the present invention by curtain coating the base polymer compound with the coating layer comprising carrier fluid, binder(s), preferably a superabsorbent polymer and optionally gelatin and/or additives, high production speed and low cost bulk production can be achieved.

In a preferred embodiment, curtain coating on a preferably Corona treated base polymer with a coating comprising a binder, preferably a superabsorber and a carrier fluid is conducted. In another preferred embodiment, the coating with the binder further comprises gelatin. In an additional preferred embodiment, a hardener as an additive is added shortly before curtain coating to the coating. A further preferred curtain coating method is conducted with a second coating comprising as an additive a hardener with a carrier fluid. In another preferred embodiment, the second coating comprises gelatin, a carrier fluid and a hardener as an additive and the hardener is added to the gelatin shortly before the curtain coating. A further preferred curtain coating method is conducted with a third coating comprising at least one biocide and optionally gelatin and a carrier fluid.

Preferably, the method according to the present invention comprises the further step of coating both sides of the base polymer compound with a different mixture each comprising at least one barrier functional layer.

Like that, it is possible to incorporate different barrier functional layers, one for instance for the direct uptake of chemicals diffused from the soil and the other one as further confinement layer on the outer surface of the film.

As already shortly mentioned above, a polymer composite material according to present invention or a product obtained by a method according to the present invention can be preferably used in agriculture as confinement film for fumigation methods.

The invention also relates to mulch film, fumigation film, propagation film comprising a polymer composite material as discussed herein.

FIGURES

FIG. 1: Schematic design of the gas permeation analytical cell Legend: 1: Feed Gas; 2: thermostated; 3: Pressure Gauge; 4: Exhaust Gas; 5: to quadrupol mass spectrometer; 6: to vacuum pump; 7: Pressure Gauge; 8: Film; 9: Porous Metal Plate; 10: Shut-Off Valve (accumulation volume between shut-off valves=6.95 cm$^3$); 11: Purge Gas FIG. 2: Overall transmission rate

EXAMPLES

Example 1

Manufacturing of Propagation Films

Propagation films by coating a polyethylene film with following additional layers was manufactured by using curtain casting machine:
Film 1:
　Base: Corona treated 100 μm thick Low-density polyethylene (LDPE) polyethylene film
　First layer: 9.36 g/m$^2$ superabsorber S1 (flexible absorbent binder composed of: 20-40% by weight Sodium Polyacrylate (CAS-No.: 9003-04-7), 2-5% by weight polyethylene glycol (CAS-No.: 25322-68-3), water (CAS-No.: 7732-18-5) dissolved in 53.40 g water
　Second layer: 9.36 g/m$^2$ superabsorber S1 dissolved in 53.40 g water
　Third layer: 9.36 g/m$^2$ superabsorber S1 dissolved in 53.40 g water
　Fourth layer: 9.36 g/m$^2$ superabsorber S1 dissolved in 53.40 g water
Film 2:
　Base: Corona treated 100 μm thick Low-density polyethylene (LDPE) polyethylene film
First layer: 9.36 g/m$^2$ superabsorber S1
　and 3.12 g/m2 gelatin dissolved in 53.40 g water
Second layer: 9.36 g/m$^2$ superabsorber S1
　and 3.12 g/m2 gelatin dissolved in 53.40 g water
Third layer: 9.36 g/m$^2$ superabsorber S1
　and 3.12 g/m2 gelatin dissolved in 53.40 g water
Fourth layer: 9.36 g/m$^2$ superabsorber S1
　and 3.12 g/m2 gelatin dissolved in 53.40 g water
Fifth layer: 2.34 g/m2 gelatin dissolved in 27.53 g water
Sixth layer: 1.20 g/m2 gelatin
　1.33 g/m2 hardener H1 (formaldehyde, concentration: 10% in water; coating amount 0.086 g hardener H1 per g gelatin). Gelatin and hardener are premixed shortly before curtain coating with 28.20 g water
Film 3:
　Base: Corona treated 100 μm thick Low-density polyethylene (LDPE) polyethylene film
First layer: 9.36 g/m$^2$ superabsorber S1
　and 3.12 g/m2 gelatin dissolved in 26.70 g water
Second layer: 9.36 g/m$^2$ superabsorber S1
　and 3.12 g/m2 gelatin dissolved in 26.70 g water
Third layer: 9.36 g/m$^2$ superabsorber S1
　3.12 g/m2 gelatin dissolved in 26.70 g water
Fourth layer: 9.36 g/m$^2$ superabsorber S1
　and 3.12 g/m2 gelatin dissolved in 26.70 g water
Fifth layer: 2.34 g/m2 gelatin dissolved in 27.53 g water
Sixth layer: 1.2 g/m2 gelatin, 1.33 g/m2 hardener H1 premixed shortly before curtain coating with 28.20 g water.
After coating, the films were dried Example 2

Mechanic Stability of the Films

Than, the films prepared according to example 1 were soaked for 10 minutes in distilled water. Subsequently, excessive water was drained and the mechanic stability was tested by washing-up the soaked layers with flowing warm water. Whereas the superabsorber S1 layers dissolve from the polyethylene layer in film 1, the additional layers in films 2 and 3 do not dissolve from the polyethylene layer.

Example 3

Permeability of the Films for Methyl Bromide

Analytical Procedure:
　Gas permeability of coated (see example 1) and uncoated low-density polyethylene (LDPE) films were measured by manometric determination of the permeating quantity of gas (by measuring the increase in pressure) and in situ determination of the gas composition using a connected mass spectrometer for multigas measurements
Description of the Analytical Device:
　The analytical device used is a gas permeation cell from Mecadi GmbH (Homurg/Saar). This analytical cell consists of two temperature-controllable stainless steel cylinder heads, between which the film to be analyzed is clamped in a gastight manner. The film is sealed against the two cell halves by pressing a Viton O ring into the film material from both sides. On the receiving side the film material rests on a porous sintered metal plate in order not only to guarantee the mechanical stability of the film even when a considerably higher absolute pressure is present on the source side than on the receiving side, but also to ensure that no significant reduction occurs in the free film area available for permeation. High precision pressure sensors (0.1 mbar resolution) for recording the changes in the absolute pressure are screwed into both cell halves. The receiving side of the cell can be sealed towards the exterior (see FIG. 1) by three VSM precision metering valves (leak rate: <1-10$^{-9}$ mbar*l/sec). The volume of the receiving side is determined once by gas-pyknometric analysis and a connected accumulation volume.

Procedure for Standard Analysis:

The analytical cell is kept at a constant temperature of 25.5 (+/−0.2)° C. The temperature on the receiving side is continuously recorded. After inserting the film, the analytical cell is purged on the source side with an inert gas for at least 30 minutes and evacuated on the receiving side down to the final pressure of the vacuum pump (about 2 mbar). Then the gas or gas mixture to be permeated (the feed gas) is introduced into the source side. The gas perfuses the source side at a constant rate of 20 sccm for the entire duration of the gas accumulation process on the receiving side. About at least 20 minutes after beginning to introduce the feed gas into the source side of the cell the valves leading to the pump and to the mass spectrometer are closed and the gas accumulation process begins on the receiving side. The increase in pressure on the receiving side is recorded as a function of time by a connected measured data logger. After allowing gas to accumulate for several hours the valve leading to the mass spectrometer is opened and the accumulated gas composition on the receiving side of the cell is analyzed. The ion streams determined by the mass spectrometer are quantified by prior calibration measurements. The oxygen content of the gas atmosphere is also examined in order to determine whether air has penetrated the receiving side of the cell from the exterior due to leaks.

Special Analysis Using a Film Moistened on the Source Side:

In order to moisten the film to a specific degree prior to the permeation analysis it is moistened by sweeping the source side with nitrogen at a rate of 20 sccm. For this purpose the nitrogen is bubbled through a water column of a height of 10 cm before being introduced into the permeation cell. By means of this process relative humidity of about 50% is produced on the source side. The duration of this pre-treatment is at least 12 hours. Then the moist nitrogen is replaced by dry nitrogen by allowing dry nitrogen to flow through the source side of the cell for 10 minutes. During this pre-treatment period the receiving side of the cell is permanently evacuated.

Permeation experiments were performed with nitrogen and a gas mixture of 5 Vol. % MeBr in nitrogen. Test results were obtained for LDPE films by MeBr/nitrogen permeation at dry and moist conditions.

Overall permeation (MeBr/N2 Mixture) is reduced by a factor of 50-100 by coating the LDPE films. Overall permeability (MeBr/N2 Mixture) is not significantly effected by moistening the coated film before permeation (see FIG. 2).

The invention claimed is:

1. A mulch film, fumigation film, or propagation film, comprising a polymer composite material with barrier functionality, comprising: a polymer film having a thickness of 10 to 250 µm and at least one barrier functional layer,
    wherein the barrier functional layer comprises at least one superabsorber binder and gelatin,
    wherein said binder comprises polyacrylate, and
    wherein the polymer film is low-density polyethylene film.

2. A mulch film, fumigation film, or propagation film according to claim 1, wherein the binder is capable of absorbing at least about 15 times its weight in an aqueous solution containing 0.9 weight percent sodium chloride.

3. A mulch film, fumigation film, or propagation film according to claim 1, wherein the polymer composite material comprises a multilayer coating structure wherein the same or different barrier functional layers are incorporated into repeating coating layers.

4. A mulch film, fumigation film, or propagation film according to claim 1, further comprising at least one coating layer, wherein an organic biocide is incorporated into said coating layer.

5. A mulch film, fumigation film, or propagation film according to claim 4, wherein the organic biocide is selected from the group consisting of pesticides, herbicides, insecticides, algicides, fungicides, moluscicides, miticides, rodenticides, germicides, antibiotics, antibacterials, antivirals, antifungals, antiseptics, antiprotozoals, antiparasites, antiseptics and disinfectants.

6. A mulch film, fumigation film, or propagation film according to claim 1, wherein the barrier functional layer has a thickness of 0.2 to 5 µm.

7. A mulch film, fumigation film, or propagation film according to claim 4, wherein said at least one coating layer comprises gelatin.

8. A mulch film, fumigation film, or propagation film according to claim 4, wherein said at least one coating layer comprises a hardener.

9. A mulch film, fumigation film, or propagation film according to claim 4, wherein said at least one coating layer comprises at least one carrier fluid.

10. A mulch film, fumigation film, or propagation film of claim 8, wherein said hardener comprises formaldehyde.

11. A mulch film, fumigation film, or propagation film of claim 9, wherein said fluid comprises water and/or an organic solvent.

12. A method for the production of a polymer composite material according to claim 1, comprising:
    a) coating the polymer film with a barrier functional compound comprising a carrier fluid and a binder, and
    b) curing the barrier functional compound comprising said carrier fluid and said binder to form a coating layer.

13. A method according to claim 12, wherein the method further comprises coating at least two sides of the polymer film with a different mixture, each comprising at least one barrier functional layer.

14. A method according to claim 12, wherein said coating comprises curtain coating.

15. A method of using the polymer composite material according to claim 1, comprising:
    applying the polymer composite material to an area to confine a chemical treatment agent.

* * * * *